US 9,873,966 B2

(12) United States Patent
Wenzel et al.

(10) Patent No.: US 9,873,966 B2
(45) Date of Patent: Jan. 23, 2018

(54) METHOD FOR STITCHING VEHICLE INTERIOR COMPONENTS AND COMPONENTS FORMED FROM THE METHOD

(71) Applicants: Edward J. Wenzel, Troy, MI (US); Joseph A. Massetti, Algonac, MI (US)

(72) Inventors: Edward J. Wenzel, Troy, MI (US); Joseph A. Massetti, Algonac, MI (US)

(73) Assignee: INTEVA PRODUCTS, LLC, Troy, MI (US)

( * ) Notice: Subject to any disclaimer, the term of this patent is extended or adjusted under 35 U.S.C. 154(b) by 0 days.

(21) Appl. No.: 14/169,853

(22) Filed: Jan. 31, 2014

(65) Prior Publication Data

US 2014/0306476 A1 Oct. 16, 2014

Related U.S. Application Data

(63) Continuation of application No. 13/543,484, filed on Jul. 6, 2012, now Pat. No. 8,833,829.

(Continued)

(51) Int. Cl.
*B62D 39/00* (2006.01)
*D05B 93/00* (2006.01)
(Continued)

(52) U.S. Cl.
CPC .......... *D05B 93/00* (2013.01); *B60R 13/0256* (2013.01); *D05B 1/06* (2013.01);
(Continued)

(58) Field of Classification Search
CPC .......... D05B 93/00; D05B 1/06; D05B 15/00; D05B 95/00; D05C 7/04; B60R 13/0256; B60R 2013/0293
(Continued)

(56) References Cited

U.S. PATENT DOCUMENTS 1,731,221 A 10/1929 Becker
1,820,935 A 9/1931 Buhler
(Continued)

FOREIGN PATENT DOCUMENTS

CN 1298974 A 6/2001
CN 1325466 A 12/2001
(Continued)

OTHER PUBLICATIONS

Written Opinion dated Jan. 25, 2013 for International application No. PCT/US2012/045798.

(Continued)

*Primary Examiner* — Lori L Lyjak
(74) *Attorney, Agent, or Firm* — Cantor Colburn LLP

(57) ABSTRACT

A method of applying stitching to an interior component is provided herein. The method including the steps of: a) penetrating the outer skin layer, the substrate layer and the intermediary layer with an awl to form a piercing therethrough; b) retracting the awl from the outer skin layer, the substrate layer and the intermediary layer; c) inserting a needle through the piercing through the substrate layer, the intermediary layer and the outer skin layer to grasp a thread positioned on the outer skin layer; d) pulling the thread through the outer skin layer, the intermediary layer and the substrate layer; e) looping the thread with a previous stitch passed through the outer skin layer, the intermediary layer and the substrate layer; f) advancing the interior component to another position, wherein a backside of the substrate layer is free of obstructions; and g) repeating steps a-f until a predetermined amount of stitches are applied to the interior component.

14 Claims, 1 Drawing Sheet

Related U.S. Application Data

(60) Provisional application No. 61/505,833, filed on Jul. 8, 2011.

(51) Int. Cl.
| | | |
|---|---|---|
| *D05B 1/06* | (2006.01) | |
| *D05C 7/04* | (2006.01) | |
| *B60R 13/02* | (2006.01) | |
| *D05B 15/00* | (2006.01) | |
| *D05B 95/00* | (2006.01) | |

(52) U.S. Cl.
CPC ............. *D05B 15/00* (2013.01); *D05B 95/00* (2013.01); *D05C 7/04* (2013.01); *B60R 2013/0293* (2013.01)

(58) Field of Classification Search
USPC ....... 296/1.08, 146.7; 428/31; 112/402, 420, 112/440, 439, 475.08
See application file for complete search history.

(56) References Cited

U.S. PATENT DOCUMENTS

| | | | |
|---|---|---|---|
| 2,147,006 A | 2/1939 | Zablocki | |
| 2,328,705 A | 9/1943 | Becker | |
| 2,332,125 A | 10/1943 | Zonis et al. | |
| 2,386,660 A | 10/1945 | Clayton | |
| 2,430,087 A * | 11/1947 | Stritter | 112/31 |
| 2,529,575 A | 11/1950 | Sailer | |
| 2,673,537 A | 3/1954 | Eastman | |
| 2,860,591 A | 11/1958 | Ness | |
| 3,055,323 A | 9/1962 | Miller et al. | |
| 3,602,168 A | 8/1971 | Yamashita | |
| 3,732,833 A | 5/1973 | Brookhyser et al. | |
| 3,866,554 A | 2/1975 | Holtzman | |
| 3,875,877 A | 4/1975 | Fox | |
| 4,169,422 A | 10/1979 | Hayes et al. | |
| 4,488,498 A | 12/1984 | Smith | |
| 4,561,367 A | 12/1985 | Corbett et al. | |
| 4,711,190 A * | 12/1987 | Smith | 112/475.23 |
| 5,094,180 A | 3/1992 | Salganik | |
| 5,313,897 A | 5/1994 | Katamine et al. | |
| 5,390,950 A * | 2/1995 | Barnes et al. | 280/728.3 |
| 5,679,296 A * | 10/1997 | Kelman et al. | 264/71 |
| 5,873,318 A * | 2/1999 | Bohlinger et al. | 112/475.08 |
| 5,988,085 A | 11/1999 | Martz | |
| 6,045,732 A * | 4/2000 | Nakatsuji et al. | 264/46.4 |
| 6,095,069 A | 8/2000 | Tadzhibaev | |
| 6,129,031 A | 10/2000 | Sarh et al. | |
| 6,178,903 B1 | 1/2001 | Bondanza et al. | |
| 6,401,643 B2 * | 6/2002 | Iida | 112/470.27 |
| 6,450,678 B1 | 9/2002 | Bayersdorfer | |
| 6,997,126 B2 * | 2/2006 | Murley | 112/475.06 |
| 7,278,363 B2 * | 10/2007 | Wieczorek et al. | 112/475.06 |
| 7,401,829 B2 | 7/2008 | Michalski et al. | |
| 7,431,484 B2 | 10/2008 | Fong | |
| 7,661,740 B2 | 2/2010 | Saito | |
| 8,215,810 B2 | 7/2012 | Welch, Sr. et al. | |
| 8,316,785 B2 | 11/2012 | Boinais et al. | |
| 8,833,829 B2 | 9/2014 | Wenzel et al. | |
| 8,919,270 B2 | 12/2014 | Wenzel et al. | |
| 9,010,259 B2 | 4/2015 | Schwarzberger | |
| 9,340,912 B2 | 5/2016 | Wenzel et al. | |
| 2003/0168151 A1 | 9/2003 | Wright et al. | |
| 2004/0206284 A1 | 10/2004 | Ochi et al. | |
| 2006/0197321 A1 | 9/2006 | Saito et al. | |
| 2007/0101771 A1 | 5/2007 | Wildeman et al. | |
| 2009/0316401 A1 * | 12/2009 | Choquet | 362/235 |
| 2010/0296302 A1 | 11/2010 | Welch, Sr. et al. | |
| 2011/0030596 A1 * | 2/2011 | Boinais et al. | 112/402 |
| 2011/0063872 A1 * | 3/2011 | Irie | 362/565 |
| 2011/0084852 A1 | 4/2011 | Szczerba et al. | |
| 2011/0171435 A1 | 7/2011 | Sheldon et al. | |
| 2012/0010588 A1 | 1/2012 | Morishita | |
| 2012/0297547 A1 | 11/2012 | Myers et al. | |
| 2012/0297643 A1 * | 11/2012 | Shaffer et al. | 36/83 |
| 2013/0008362 A1 | 1/2013 | Wenzel et al. | |
| 2013/0009416 A1 | 1/2013 | Wenzel et al. | |
| 2013/0014682 A1 | 1/2013 | Brindzik | |
| 2013/0147228 A1 | 6/2013 | Filipp | |
| 2014/0339843 A1 | 11/2014 | Wenzel et al. | |
| 2015/0033996 A1 | 2/2015 | Wenzel et al. | |
| 2015/0040812 A1 | 2/2015 | Schwarzberger | |
| 2015/0158115 A1 | 6/2015 | Davies | |
| 2015/0176165 A1 | 6/2015 | Iivenzel et al. | |
| 2016/0096490 A1 | 4/2016 | Wenzel et al. | |

FOREIGN PATENT DOCUMENTS

| | | |
|---|---|---|
| CN | 1826443 A | 8/2006 |
| CN | 201176507 | 1/2009 |
| DE | 3703070 A1 | 9/1988 |
| JP | 03097491 A | 4/1991 |
| JP | 6511395 A | 12/1994 |
| JP | 2001162068 A | 6/2001 |
| JP | 2005087510 A | 4/2005 |
| JP | 2006075221 A | 3/2006 |
| JP | 2006081636 A | 3/2006 |
| JP | 2006273312 A | 10/2006 |
| JP | 2013043571 A | 3/2013 |
| KR | 1020030024287 A | 3/2003 |
| KR | 1020060050815 A | 5/2006 |
| WO | 2004078518 | 9/2004 |
| WO | 2013090371 | 6/2013 |

OTHER PUBLICATIONS

Englisth Abstract CN1746365, equivilent to KR102006000815.
Englisth Abstract JP03097491.
Englisth Abstract JP2001162068.
International Search Report dated Jan. 25, 2013 for International application No. PCT/US2012/045798.
English Abstract KR1020030024287.
English Translation of the first office action for patent application No. 201280033806.X; Date of Issue: Feb. 3, 2015.
First office action for patent application No. 201280033806.X; Date of Issue: Feb. 3, 2015.
English Translation of CN201176507 Abstract.
English Translation of DE10060771 Abstract which corresponds with CN1298974.
English Translation of DE3703070 Abstract.
English Translation of JP2013043571 Abstract.
Chinese Office Action for Application No. 201280033806.X; dated Feb. 3, 2015; 9 pgs.
CN Office Action for Application No. 20120034003.6 dated Dec. 2, 2014; 7 pgs.
CN Office Action for Application No. 201280034003.6 dated Jul. 24, 2015; 5 pgs.
English Translation for CN Office Action for Application No. 201280034003.6 dated Jul. 24, 2015; 5 pgs.
English Translation of Chinese Office Action for Application No. 201280033806.X; dated Feb. 3, 2015; 11 pgs.
English Translation of CN Office Action for Application No. 201280034003.6 dated Dec. 2, 2014; 8 pgs.
English Translation of Third Chinese Office Action for Application No. 201280033806.X; dated Feb. 22, 2016; 1 pg.
International Search Report dated Jan. 25,2013 for International application No. PCT/US2012/045797; International filing date: Jul. 6, 2012; 5 pgs.
International Search Report for International application No. PCT/US2015/043438; International Filing Date: Aug. 3, 2015; dated Nov. 19, 2015; 3 pgs.
International Search Report for International Application No. PCT/US2015/043436; International Filing Date: Aug. 3, 2015; dated Nov. 12, 2015; 3 pgs.
International Written Opinion for International Application No: PCT/US2015/043436; International Filing Date: Aug. 3, 2015; dated Nov. 12, 2015; 4 pgs.

(56) References Cited

OTHER PUBLICATIONS

International Written Opinion for International Application No. PCT/US2015/043438; International Filing Date: Aug. 3, 2015; dated Nov. 19, 2016; 5 pgs.
Non-Final Office Action for U.S. Appl. No. 14/450,609, filed Aug. 4, 2014; dated Sep. 28, 2015; 9 pgs.
PCT International Search Report for International Application No. PCT/US2015/056907; International Filing Date: Oct. 22, 2015; dated Feb. 4, 2016; 3 pgs.
PCT Written Opinion for International Application No. PCT/US2015/056907; International Filing Date: Oct. 22, 2015; dated Feb. 4, 2016; 3 pgs.
Third Chinese Office Action for Application No. 201280033806.X; dated Feb. 22, 2016; 3 pgs.
Written Opinion dated Jan. 25, 2013 for International application No. PCT/US2012/045797; International filed: Jan. 25, 2013; 5 pgs.
English Abstact for JP2006081636A—Mar. 30, 2006; 2 pgs.
English Abstract for JP2005087510A—Apr. 7, 2005; 1 pg.
English Abstract for JP2006075221A—Mar. 23, 2006; 1 pg.
English Abstract for JP6511395A—Dec. 22, 1994; 1 pg.
English Translation for Japanese Office Action Patent Application No. 2014-519078; dated May 31, 2016; 5 pgs.
English Translation of Japanese Office Action for Patent Application No. 2014-519079; dated Apr. 26, 2016; 4 pgs.
Japanese Office Action for Application No. 2014-519078; dated May 31, 2016; 5 pgs.
Japanese Office Action for Patent Application No: 2014-519079; dated Apr. 26, 2016; 5 pgs.

* cited by examiner

METHOD FOR STITCHING VEHICLE INTERIOR COMPONENTS AND COMPONENTS FORMED FROM THE METHOD

CROSS REFERENCE TO RELATED APPLICATIONS

This application is a continuation of U.S. patent application Ser. No. 13/543,484 filed Jul. 6, 2012, which claims the benefit of U.S. Provisional Application Ser. No. 61/505,833, filed Jul. 8, 2011, the contents each of which are incorporated herein by reference thereto.

BACKGROUND

This invention relates to an interior structure for a vehicle interior. More particularly, the invention relates to an apparatus for stitching vehicle interior components.

Currently, most stitching found in an automotive interior is of the functional variety, wherein two or more pieces of material (leather, vinyl, TPO, cloth, etc) are cut from a pattern and sewn together (cut-n-sew) prior to being wrapped around a component such as a seat cushion, head rest, arm rest, console lid, instrument panel substrate, etc. Such functional stitching is very labor intensive and is normally used only where required on low and mid-class vehicles. Functional stitching on decorate components such as instrument panel retainers and door panels has typically been restricted to higher class vehicles due to cost.

In recent years, automotive original equipment manufacturers (OEMs) have shown an interest in applying the "stitched" look to more vehicles over a wider range of price classes. A simulated non-functional stitch has been used in some applications; however, the ability to offer a simulated stitch in a contrasting color is not production feasible at this time. Additionally, more OEMs are requested that a real or "live" stitch be used on decorate components to provide the look and feel of a true cut-n-sew component.

Accordingly, it is desirable to provide a live, non-functional stitch on decorative automotive trim components.

SUMMARY OF THE INVENTION

A method of applying stitching to an interior component, comprising an outer skin layer, a substrate layer and an intermediary layer located between the outer skin layer and the substrate layer is provided. The method including the steps of: a) penetrating the outer skin layer, the substrate layer and the intermediary layer with an awl to form a piercing therethrough; b) retracting the awl from the outer skin layer, the substrate layer and the intermediary layer; c) inserting a needle through the piercing through the substrate layer, the intermediary layer and the outer skin layer to grasp a thread positioned on the outer skin layer; d) pulling the thread through the outer skin layer, the intermediary layer and the substrate layer; e) looping the thread with a previous stitch passed through the outer skin layer, the intermediary layer and the substrate layer; f) advancing the interior component to another position; and g) repeating steps a-f until a predetermined amount of stitches are applied to the interior component.

Also provided herein is an interior component of a vehicle formed by the above method.

In another embodiment, a method of applying stitching to an interior component is provided. The method including the steps of: a) penetrating the outer skin layer, the substrate layer and the intermediary layer with an awl to form a piercing therethrough; b) retracting the awl from the outer skin layer, the substrate layer and the intermediary layer; c) inserting a needle through the piercing through the substrate layer, the intermediary layer and the outer skin layer to grasp a thread positioned on the outer skin layer; d) pulling the thread through the outer skin layer, the intermediary layer and the substrate layer; e) looping the thread with a previous stitch passed through the outer skin layer, the intermediary layer and the substrate layer; f) advancing the interior component to another position, wherein a backside of the substrate layer is free of obstructions; and g) repeating steps a-f until a predetermined amount of stitches are applied to the interior component.

BRIEF DESCRIPTION OF THE DRAWINGS

Other features, advantages and details appear, by way of example only, in the following description of embodiments, the description referring to the drawings in which.

DETAILED DESCRIPTION

Figure 1:
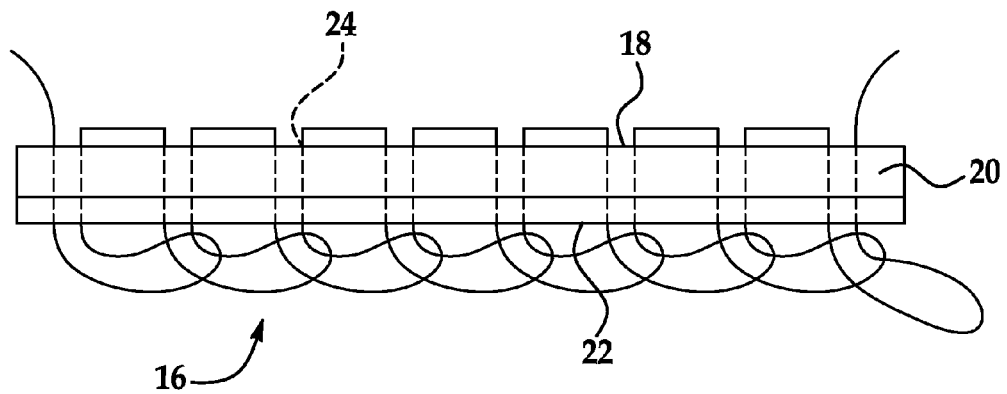
FIG. 1 is a cross-sectional view of an interior portion of a component stitched in accordance with an exemplary embodiment of the present invention.

Turning now to the drawings, wherein to the extent possible like reference numerals are utilized to designate like components throughout the various views, in FIG. 1 it is seen that an interior portion 16 of a vehicle is illustrated. In one implementation interior portion 16 is a portion of an instrument panel of a vehicle.

As best illustrated in FIG. 1, the interior portion 16 is preferably of a multi-layered construction. This multi-layered construction preferably includes an outer skin layer 18 having a substantially smooth outer surface and an underside facing away from the outer surface. The outer skin layer 18 is preferably formed of a plastic material of substantial flexibility and aesthetically pleasing character.

In order to enhance the softness of portion 16, a layer of cushioning support material 20 is provided in the region below the outer skin layer 18. It is contemplated that the cushioning support material 20 may be of any number of different constructions although a foamed material such as cross linked polypropylene (XLPP) foam may be potentially preferred. A substrate panel 22 of dimensionally stable plastic or other suitable material is preferably disposed below the cushioning support material.

According to the potentially preferred embodiment, the cushioning support material 20 and the substrate panel 22 thus serve cooperatively to provide a support structure for the outer skin layer 18.

It is contemplated that XLPP foam forming the cushioning support material 20 may be blown between the outer skin layer 18 and the substrate panel 22 so as to form a multi-layered composite structure of a form substantially as illustrated in FIG. 1. It is also contemplated that the cushioning material 20 may be attached to the outer skin layer 18 in a preliminary cladding operation so as to form a preliminary layered composite which may thereafter be applied across any substrate panel 22 as may be utilized.

In accordance with an exemplary embodiment of the present invention live non-functional stitching can be applied interior portion in one of the following ways:

1) Stitch a pattern on an unformed single or multilayer construction of trim material and wrap the sewn trim sheet around a preformed/precut substrate;

2) Stitch a pattern on a preformed single or multilayer construction of trim material and bond the sewn trim preform to a preformed molded substrate; and 3) Stitch a pattern on a flat or relatively flat single or multilayer trim & substrate component construction.

As the part complexity and size increase, option 1 becomes impractical as unformed trim material can only be applied to relatively flat surfaces.

Option 2 requires that the size and shape of the preformed & stitched skin match that of the molded substrate nearly perfect. Also, option 2 requires that all surfaces in die draw have adequate draft in order to accommodate nesting without damage to the preform. All undercuts with Option 2 require automated or manual edge wrapping to finish.

Option 3 eliminates the fit and finish issues associated with option 2 but is limited by the ability of the sewing machine to reach confined areas of the part while possessing the capability to drive a needle through trim and substrate material of the component. Likewise, any backside features (ribbing, bosses, etc.) required for component structure or attachment cannot be located in the area directly behind/beneath the stitch path.

This application proposes a means to stitch through trim and substrate of a large, contoured soft trim clad automotive interior trim panel to eliminate the manufacturing cost and complexity associated with Option 2 above and be designed and manufactured in such a way that the stitching can be located directly above backside features if required.

Various exemplary embodiments of the invention described herein consists of the use of a chain stitch pattern machine that uses an awl on the upper portion of the head to penetrate the trim and substrate of the interior component. After the awl exits a hole 24 it produced in the component, a needle with a hook protrudes into and through the hole 24 from the lower arm of the machine to grasp the thread held in position by a thread tensioner arm. Once hooked, the thread is pulled through the hole and through the loop from the previous stitch. The needle also advances the part to the next point of awl penetration as it pulls the thread down through the hole 24. The needle then advances to the hook position once again while the awl is engaged with the part so the part does not move and needle can move through the newly formed hole without hesitation once the awl exits the part.

By utilizing an awl to produce the stitch hole, much more robust material constructions can be stitched (composites, metals, etc) with minimal damage to the top surface of the part or the awl. Damage to the thread is minimized by the fact that the thread is not pulled back and forth through the hole multiple times as is the case with the lockstitch pattern. Very large tex threads can be used without concern for needle breakage.

The post bed stitch plate for such a chain stitch machine as described above can be a small as 10 mm×15 mm, a significant reduction from previous robotic chain stitch plate dimension of 16 mm×44 mm (of course, dimensions greater or less than these are considered to be within the scope of exemplary embodiments of the present invention). Access to very tight confines of parts is now possible, particularly through-plane radii wherein minimizing stitch plate length is critical.

The optimal machine configuration for sewing trim/substrate constructions in a manual fashion would be a high post, long arm machine. Manual or fixture guided part feed would be required.

The optimal machine configuration for robotic sewing would be dependent on the part design. The key factor again is the compact size to the stitch plate. Cylinder arm length and post bed height would depend on the application.

To facilitate the stitch location on the part, it is proposed that the backside or ISM side of the retainer be free and clear of any multiplane style line, ribs, bosses or any other obstruction that would prevent passage/contact of the stitch plate along the backside of the part for the entire stitch length. In the event that a backside feature cannot be moved from the stitch path, it is proposed that a separate component be molded which contains said feature and be subsequently attached the substrate after stitching. This secondary attachment could be performed via heat staking, IR welding, adhesives, or any other suitable method.

It is also proposed that the substrate material be locally reduced to a thickness more suitable for stitching should the need arise. For instance, a part with a nominal wall thickness of 2.5 mm could locally be reduced to 1.5 or 2.0 mm at a width of 15 to 20 mm along the stitch path. This depression in the backside of the part would also serve to locate a separate piece containing ribs or bosses as needed prior to attachment. Compression molding of the substrate panel could accommodate a reduction in nominal wall thickness from 2.0 mm to 1-1.5 mm in the stitching area. Of course, dimensions greater or less than the aforementioned values are considered to be within the scope of exemplary embodiments of the present invention.

Figure 2:
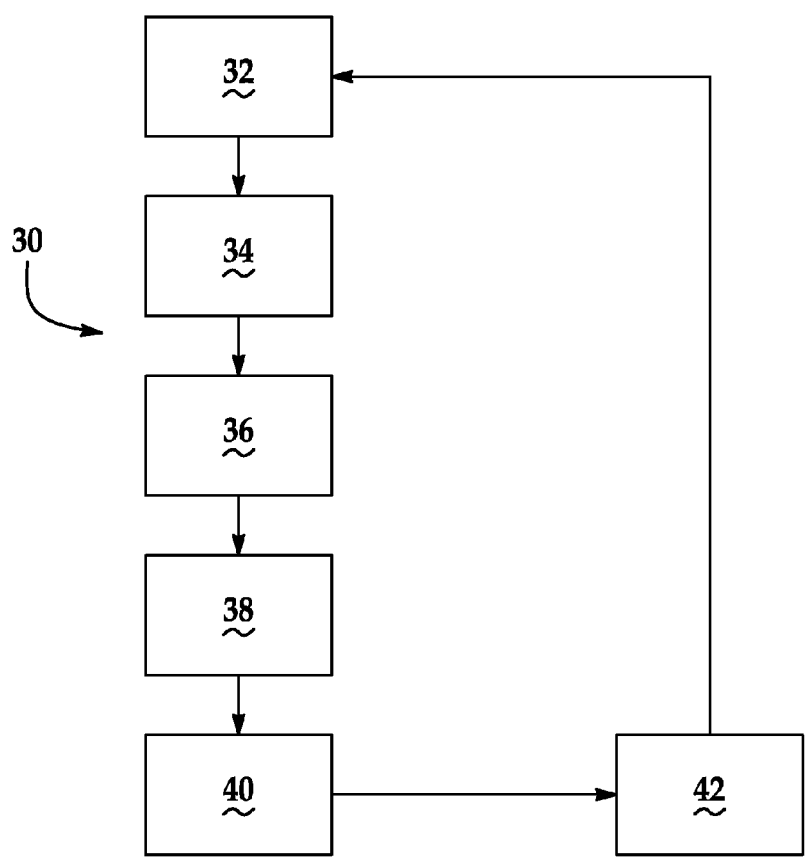
FIG. 2 is a flow chart illustrating a method according to one exemplary embodiment of the present invention.

Referring now to FIG. 2 a flow chart 30 illustrating a method of applying stitching to an interior component according to one exemplary embodiment of the present invention is provided. Here the interior component has an outer skin layer, a substrate layer and an intermediary layer located between the outer skin layer and the substrate layer.

At box 32, the outer skin layer, the substrate layer and the intermediary layer are penetrated with an awl to form a piercing therethrough. At box 34, the awl is retracted after the piercing is formed.

Thereafter and at box 36, a needle is inserted through the piercing (e.g., through the substrate layer, the intermediary layer and the outer skin layer) to grasp a thread positioned on the outer skin layer. Once the step of box 36 is completed, the thread is pulled through the outer skin layer, the intermediary layer and the substrate layer at box 38.

Afterwards and at box 40, the thread is looped with a previous stitch passed through the outer skin layer, the intermediary layer and the substrate layer, unless of course this is the first stitch. Once the step of box 40 is completed, the interior component is advanced or moved to another position relative to the awl and needle at box 42 and then the processes or steps of boxes 32-42 are repeated until a predetermined amount of stitches are applied to the interior component.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the present application.

What is claimed is:

1. A method of applying stitching to an interior component, comprising an outer skin layer, a substrate layer and an intermediary layer located between the outer skin layer and the substrate layer, the method comprising:
   a) penetrating the outer skin layer, the substrate layer and the intermediary layer downwardly with an awl to form a piercing therethrough;
   b) retracting the awl upwardly from the outer skin layer, the substrate layer and the intermediary layer;
   c) inserting a needle upwardly through the piercing through the substrate layer, the intermediary layer and the outer skin layer to grasp a thread positioned on the outer skin layer;
   d) pulling the thread downwardly through the outer skin layer, the intermediary layer and the substrate layer;
   e) looping the thread with a previous stitch passed through the outer skin layer, the intermediary layer and the substrate layer;
   f) advancing the interior component to another position, wherein a backside of the substrate layer is free of obstructions; and
   g) repeating steps a-f until a predetermined amount of stitches are applied to the interior component.

2. The method as in claim 1, wherein outer skin layer, is formed from the group consisting of vinyl, leather and thermoplastic polyolefin; and the intermediary layer is a foam and the substrate layer is formed from plastic.

3. An interior component formed by the method of claim 2, wherein the interior component is an interior trim piece of a vehicle.

4. The interior component of claim 3, wherein the interior trim piece is a portion of an instrument panel of the vehicle.

5. An interior component formed by the method of claim 1, wherein the interior component is an interior trim piece of a vehicle.

6. The interior component of claim 5, wherein the interior trim piece is a portion of an instrument panel of the vehicle.

7. The method as in claim 1, wherein outer skin layer, is formed from leather and the intermediary layer is foam and the substrate layer is formed from plastic.

8. The interior component formed by the method of claim 1, wherein the backside of the substrate layer is free of obstructions along the entire stitch length.

9. The interior of claim 8, wherein the interior component is an interior trim piece of a vehicle.

10. The interior component of claim 9, wherein the interior trim piece is a portion of an instrument panel of the vehicle.

11. The interior component formed by the method of claim 1, wherein the backside of the substrate layer is configured to have a separate component attached thereto, the separate component being free of any obstructions.

12. The interior component of claim 11, wherein the interior component is an interior trim piece of a vehicle.

13. The interior component of claim 12, wherein the interior trim piece is a portion of an instrument panel of the vehicle.

14. The interior component of claim 13, wherein outer skin layer is formed from leather and the intermediary layer is foam and the substrate layer is formed from plastic.

* * * * *